US006585607B2

(12) United States Patent
Tzivanis et al.

(10) Patent No.: US 6,585,607 B2
(45) Date of Patent: Jul. 1, 2003

(54) ADHESION PROCESS

(75) Inventors: Michael John Tzivanis, Chicopee, MA (US); William M. Risen, Jr., Rumford, RI (US); Robert A. Weiss, Mansfield Center, CT (US); Thomas J. Kennedy, III, Wilbraham, MA (US); David M. Melanson, Chicopee, MA (US)

(73) Assignee: Spalding Sports Worldwide, Inc., Chicopee, MA (US)

( * ) Notice: Subject to any disclaimer, the term of this patent is extended or adjusted under 35 U.S.C. 154(b) by 0 days.

(21) Appl. No.: 09/885,835

(22) Filed: Jun. 20, 2001

(65) Prior Publication Data

US 2003/0040377 A1 Feb. 27, 2003

(51) Int. Cl.$^7$ .......................... A63B 37/04; A63B 37/06; A63B 37/00
(52) U.S. Cl. ........................................ 473/371; 473/351
(58) Field of Search ................................. 473/351–378; 156/272.6; 427/322

(56) References Cited

U.S. PATENT DOCUMENTS

| | | | |
|---|---|---|---|
| 4,141,559 A | 2/1979 | Melvin et al. | |
| 4,264,075 A | 4/1981 | Miller et al. | |
| 4,613,403 A | 9/1986 | Oyachi et al. | |
| 4,844,979 A | 7/1989 | Strobel et al. | |
| 4,904,320 A | 2/1990 | Isaac et al. | |
| 5,061,521 A | 10/1991 | Endo et al. | |
| 5,069,927 A | 12/1991 | Lawson et al. | |
| 5,255,922 A | 10/1993 | Proudfit | |
| 5,286,532 A | 2/1994 | Yoshikawa et al. | |
| 5,316,739 A | 5/1994 | Yoshikawa et al. | |
| 5,466,424 A | 11/1995 | Kusano et al. | |
| 5,878,670 A | 3/1999 | Yamaguchi | |
| 5,985,370 A * | 11/1999 | Ohira et al. | 427/322 |
| 5,989,136 A | 11/1999 | Renard et al. | |
| 5,998,506 A | 12/1999 | Nesbitt | |
| 6,013,153 A * | 1/2000 | Koinuma et al. | 156/272.6 |
| 6,103,166 A | 8/2000 | Boehm et al. | |
| 6,162,134 A * | 12/2000 | Sullivan et al. | 473/354 |
| 6,315,915 B1 * | 11/2001 | Hebert et al. | 156/272.6 |
| 6,342,019 B1 * | 1/2002 | Boehm et al. | 473/371 |

FOREIGN PATENT DOCUMENTS

WO    WO 01/15781 A1    8/2001

OTHER PUBLICATIONS

Butts, Mathew et al., "Silicones", Kirk–Othmer Encyclopedia of Chemical Technology, Copyright 1997 by John Wiley & Sons, In.*

* cited by examiner

Primary Examiner—Paul T. Sewell
Assistant Examiner—Alvin A. Hunter

(57) ABSTRACT

Disclosed is a process to increase adhesion between two adjacent layers. The process comprises roughening the surface of one layer followed by chlorination of the roughened surface and joining of the layers, or treating the surface of one layer with a silicone-based adhesion promoter and joining the layers. In one preferred embodiment the process comprises roughening the surface of one layer, followed by chlorination of the roughened surface, joining of the layers and post-treatment of the molded layers at an elevated temperature for a predetermined time.

11 Claims, No Drawings

ADHESION PROCESS

FIELD OF THE INVENTION

This invention relates generally to processes for improving the adhesion between adjacent layers of material.

BACKGROUND OF THE INVENTION

Golf balls traditionally have been categorized in different groups, namely as one-piece, two-piece and three-piece balls. One-piece balls comprise a solid molded mass of the same material and do not have a core. Two-piece golf balls comprise a solid resilient core and an outer cover comprised of a different type of material molded thereon. Three-piece golf balls traditionally include a liquid or solid core, an elastomeric winding around the core and an outer cover molded thereon.

The outer cover of either two or three-piece golf balls may comprise single or multiple layers of molded material. The cover material may be balata (transpolyisoprene, natural or synthetic rubbers), although synthetic covers comprising non-ionomeric materials, for example polyurethane, or ionomeric polymers (polymers containing interchain ionic bonding) have become increasingly prevalent.

Additionally, despite their two and three-piece names, golf balls of either type may also comprise additional layers intermediate the cover and core or windings. The intermediate layers may be comprised of a wide range of materials, including polymers such as polyurethane, non-ionomeric and ionomeric materials.

Typically, the layers of multilayer golf balls are formed by applying them around the golf ball core or a preceding intermediate layer. Conventional techniques for applying such layers include injection molding, compression molding and casting the layer material around the underlying structure. A crucial aspect of the manufacture of multilayer balls is obtaining good adhesion strength between the various layers. If the adhesion strength between the layers does not meet desired levels, the performance of the golf ball will be adversely affected. For example, poor adhesion can cause air pockets between the layers, which can result in separation of the layers when the golf ball is struck with a club.

Further, as can be seen from the above, the possible combinations of core layers and materials, intermediate layers and materials and cover layers and materials are very large. As would be expected, the materials of one layer are often dissimilar in physical and chemical properties from those of an adjacent layer. This can make achieving a desired adhesion strength between the dissimilar layers difficult. In any configuration however, the material of each of the golf ball layers must be securely joined to the adjacent underlying and overlying layers to provide acceptable adhesion strength, performance and durability.

SUMMARY OF THE INVENTION

An object of the invention is to provide a process for improving interlayer adhesion strength of joined adjacent materials.

Another object of the invention is to provide a process for enhancing interlayer adhesion strength of molded parts.

A further object of the invention is to provide a process to improve adhesion strength between adjacent layers in a golf ball.

One aspect of the present invention comprises a process for enhancing adhesion between adjacent layers. The process comprises roughening the surface of one of the layers; chlorination of the roughened layer and joining of the roughened and chlorinated layer to an untreated layer. Advantageously, the process comprises roughening the surface of one of the layers, followed by chlorination of the roughened layer, after which the layers are joined and subjected to a post-treatment involving holding the joined layers at a temperature well above their normal cure temperature for a predetermined time. Further advantageously the surfaces of both layers may be roughened and/or chlorinated. The process provides a bond of enhanced strength between adjacent layers. The enhanced interlayer adhesion strength minimizes undesirable early or premature separation between the joined layers.

Another aspect of the present invention comprises a process for enhancing adhesion between adjacent layers. The process comprises application of a silicone-based adhesion promoter to a layer of a golf ball, then application of an additional layer to the treated layer. Optionally, the process comprises roughening the surface of one of the layers prior to application of the silicone-based adhesion promoter. The layers may optionally be subjected to a post-treatment involving holding the joined layers at a temperature well above their normal cure temperature for a predetermined time, or other types of post treatment known in the art, such as gamma radiation, infrared treatment (IR), ultraviolet treatment (UV), corona treatment, plasma treatment, interlocking mechanical features, other chemical adhesion promoters, e-beam treatment, and the like. Further advantageously the surfaces of both layers may be roughened and/or treated with the adhesion promoter. The process provides a bond of enhanced strength between adjacent layers. The enhanced interlayer adhesion strength minimizes undesirable early or premature separation between the joined layers.

The invention accordingly comprises the several steps and the relation of one or more of such steps with respect to each of the others and the article possessing the features, properties, and the relation of elements exemplified in the following detailed description.

DETAILED DESCRIPTION OF THE INVENTION

For ease of understanding and clarity of description, the inventive adhesion process is below described in its application to golf balls. It should be understood that this description is nonlimiting and the process has applications beyond such description.

Golf balls comprise a core over which a cover is molded. The golf ball may have at least one intermediate or mantle layer disposed between the core and the cover. Conventional solid cores can be compression molded from a slug of uncured or lightly cured elastomer composition comprising a high cis content polybutadiene and a metal salt of an unsaturated carboxylic acid such as zinc mono or diacrylate or methacrylate. To achieve higher coefficients of restitution in the core, the manufacturer may include fillers such as small amounts of a metal oxide, for example zinc oxide. In addition, larger amounts of metal oxide than those that are needed to achieve the desired coefficient are often included in conventional cores in order to increase the core weight. Other materials may be used in the core composition including, for example, a compatible rubber, ionomer or low molecular weight fatty acids such as stearic acid. Free radical initiators such as peroxides are admixed with the core composition so that on the application of heat and pressure, a complex curing cross-linking reaction takes place. The core materials are mixed, milled, preformed into a slug, molded into a core and optionally ground to size. Wound cores are generally produced by winding under tension an elastic thread around a solid or liquid filled balloon center. Wound cores are also suitable for use with the invention.

At least one intermediate or mantle layer can be formed around the core using known techniques. For example the mantle layer can be formed by injection molding techniques wherein the core is placed into the center of a mold and the molten intermediate layer composition is injected into the mold. The injected composition is retained within the mold to solidify and/or cure for a suitable period of time at a suitable mold temperature. The exact mold temperature and retention time is dependent on the composition used for the intermediate layer, although it is generally desired to use as low a temperature and as short a time as possible. Alternatively, the intermediate layer material can be formed into hemispherical shells such as by injection molding molten material into a mold and cooling. The molded half shells are then positioned around the core in a mold and subjected to compression molding at e.g. about 200 to 300° F. for about 2 to 10 minutes, followed by cooling at about 50 to 70° F. for about 2 to 10 minutes. Compression molding fuses the half shells together to form an unitary ball. Again the exact temperature and time is dependent on the material used for the intermediate layer, although it is generally desired to use as low a temperature and as short a time as possible. Further alternatively, a liquid intermediate layer material can be cast around a core. Naturally, it would be possible to form an overlying mantle layer over a previously formed layer—and the invention also has application with such layers.

A large number of materials can be used to produce the mantle layer including polyurethane, ionomer, terpolymer, polyolefin, metallocene catalyzed polyolefin, polyamide block copolymer, polyester/polyether block copolymer polymer and mixtures thereof. As used herein, an ionomer is typically the metal salt of the reaction product of an olefin having from about 2 to 8 carbon atoms and an unsaturated monocarboxylic acid having from about 3 to 8 carbon atoms. Copolymers containing more than 16 percent carboxylic acid are considered "high acid" ionomers while those containing 16 percent carboxylic acid or less are considered "low acid" ionomers. As non-limiting examples, sodium, zinc, magnesium, manganese, potassium, calcium, nickel and lithium can be used as the neutralizing cation. Preferably, the ionomeric resins are copolymers of ethylene with either acrylic or methacrylic acid. Non-limiting examples of commercially available high acid methacrylic acid-based ionomers that can be used in accordance with the invention include those sold by DuPont under the name Surlyn®. Non-limiting examples of "high acid" acrylic acid-based ionomers that can be used in the present invention also include materials sold by Exxon Chemicals under the names Escor® and Iotek®. Furthermore, a number of other high acid ionomers neutralized to various extents by different types of metal cations, including manganese, lithium, potassium, calcium and nickel and several new high acid ionomer and/or high acid ionomer blends other than sodium, zinc and magnesium can be used for golf ball production. As previously noted, the inventive adhesion process can be used with low acid ionomers. The low acid ionomers tend to be softer than high acid ionomers. Non-limiting examples of low acid ionomers are believed to include materials sold by Exxon Chemicals under the names Escor® 4000, Escor® 4010, Escor® 8000 and Escor® 8020. In some circumstances, an additional co-monomer such as an acrylate ester, e.g. iso-n-butylacrylate, can be used with the above copolymers to produce a somewhat softer terpolymer.

As used herein, polyurethane includes, but is not limited to, thermoplastic polyurethane (such as Texin® thermoplastic polyurethanes available from Mobay Chemical Co. and Pellethane® thermoplastic polyurethanes available from Dow Chemical Co.); polyester polyurethane (such as Estane® X-4517 avaialable from B. F. Goodrich Co.); thermoplastic polyurethane (such as Elastollan® 1100 series, polyether based thermoplastic polyurethane available from BASF); block copolyurethane, which typically contain blocks of a polyurethane oligomer (material with a higher softening point) alternating with lower softening point blocks of either a polyether oligomer, for a block copoly (ether-urethane), a polyester oligomer for a block copoly (ester-urethane) or a polybutadiene or partially or fully hydrogenated polybutadiene oligomer for a block copoly (butadiene-urethane); and crosslinkable thermoplastc polyurethane (such as EBXL-TPU available from Zylon Polymers, 23 Mountain Avenue, Monsey, N.Y. 10952). It should be noted that compounding some polyurethanes such as the above-mentioned Elastollan® 1100 series with certain reactive co-agents will allow the compound to crosslink using irradiation. One co-agent suitable for crosslinking some polyurethanes is Liquiflex™, an hydroxyl terminated polybutadiene (HTPB) available from Petroflex.

The cover may be comprised of a conventional material such as balata, polyurethane, ionomer, terpolymer, metallocene catalyzed polyolefin, polyamide block copolymer, polyester/polyether block copolymer and mixtures thereof. The cover may be applied to the core and/or intermediate layer using any known technique. For example, the cover can be applied using casting or the above-described injection or compression molding processes. Alternatively, a polyurethane cover can be applied to the above intermediate layer using a process such as Reaction Injection Molding ("RIM"), or any other process known in the art for applying a cover to a core.

It is within the scope of the present invention to admix into the mantle and/or cover compositions compatible materials in amounts sufficient to achieve a desired effect. Among such materials are known coloring agents, including dyes, pigments and brighteners; filler materials; and additives such as antioxidants, antistatic agents and stabilizers.

After application of the intermediate and cover layers is complete, the golf balls produced may undergo various further processing steps such as removal of mold lines, buffing, painting, and marking.

The adhesion process is advantageous and can be practiced with any adjacent layers, for example, with core and intermediate layers, with adjacent intermediate layers or with the intermediate and cover layers. The process is especially advantageous when used with layers that have known poorer adhesion strength, for example, an ionomeric intermediate layer and a polyurethane cover layer. Therefore, the process will be described with relation to this arrangement, although it should be understood that this description is non-limiting and that the process can be used with other layers and material combinations.

In a first preferred embodiment, at least one surface to be joined is roughened. Preferably, the mantled core (core and molded ionomeric intermediate layer) is processed to roughen the exterior surface of the ionomeric intermediate layer. Centerless grinding of the mantled core has been found a suitable method for surface roughening. The surface should be roughened to a surface finish in the range of about 0.5 μin. to about 2000 μin. Advantageously, the surface can be roughened to a surface finish in the range of about 1 μin to about 1000 μin. Preferably, the surface can be roughened to a surface finish in the range of about 8 μin to about 250 μin. Both surfaces to be joined can be roughened in some embodiments.

After roughening, at least one surface to be joined is chlorinated. Advantageously, the roughened surface is chlorinated. Further advantageously the chlorination step may comprise any means of exposure of the desired surface to chlorine anions. For example, a roughened mantled core may be immersed in a liquid solution containing free chlorine. After immersion the mantled core is rinsed and allowed to dry. Both surfaces to be joined can be chlorinated in some embodiments.

The cover is conventionally molded over the treated mantled core. After molding of the cover, the golf ball is preferably subjected to a post-treatment step or process involving holding the golf ball at an elevated temperature for a predetermined time. The post-treatment temperature will be limited by the softening and melting points of the materials used. It has been found that the post-treatment temperature should generally be above the normal temperatures used for molding of the golf ball cover. Naturally, post-treatment time will be related to the post-treatment temperature, with lower temperatures requiring longer post-treatment times. The post-treatment will typically comprise placing the molded ball at an elevated temperature in the range of about 100 to about 400° F. for a predetermined time in the range of about 5 minutes to about 24 hours at the low end of the temperature range. As one example, a post-treatment temperature of about 250° F. for about 30 minutes was found suitable.

In a second preferred embodiment, one surface of the mantled core is treated with a silicone-based adhesion promoter. Preferably, the silicone-based adhesion promoters are aminofunctional and/or hydroxyfunctional silicone compounds, such as organosilanes and water-borne silsesquioxane oligomers. Examples of silicone-based adhesion promoters suitable for use in the present invention include, but are not limited to, silsesquioxane oligomers having aminopropyl or aminoethylaminopropyl functional groups. Commercially available water-borne silsesquioxane oligomers, such as N-(2-aminoethyl)-3-aminopropltrimethoxysilane, are available from Gelest, Inc., Tullytown, Pa. A preferred silsesquioxane oligomer for use in the present invention is a water-borne silsesquioxane oligomer available from Gelest, Inc., as shown below. The subscripts m and n are chosen such that the molecular weight is in the desired range, preferably between about 250 and 650.

Silsesquioxane oligomer (Gelest WSA-9911):

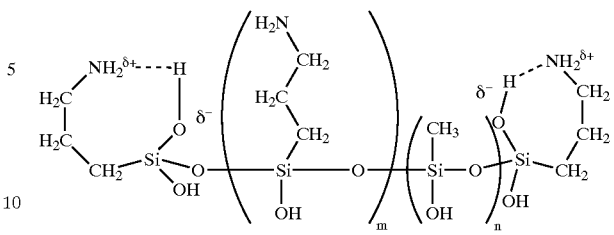

The adhesion promoter may be used as a primer or in a dilute solution with various solvents. One example of a dilute solution is a solution of 2% by weight of the silicone-based adhesion promoter in a solution of 95% ethanol and 5% water. The golf ball core or mantled core is treated with the adhesion promoter in any method known in the art, such as dipping, spray coating, and the like, and allowed to dry. The treated golf ball core may air dry or be dried using any conventional drying method. A cover or other additional layer is then applied to the treated layer.

Any layer, such as a core, a mantle or a cover, may optionally be roughened, as previously described, in order to improve adhesion between layers. Additionally, a post-treatment step using increased temperature, as previously described, may also be included in the process. One or more layers may optionally be treated using adhesion-promoting techniques known in the art. Examples of additional adhesion promoting techniques include, but are not limited to, the use of plasma treatment, corona treatment, flame treatment, interlocking mechanical features, other chemical adhesion promoters, chlorination, and other post-treatment techniques such as UV, IR, gamma rays, e-beam, and the like. One or more additional treatments may be used in combination with the adhesion promoting treatment of the present invention.

Having generally described the invention, the following examples are included for purposes of illustration so that the invention may be more readily understood. The examples are in no way intended to limit the scope of the invention unless otherwise specifically indicated.

EXAMPLES

A number of solid core golf balls having a single ionomeric intermediate layer and a single layer polyurethane cover were prepared. The solid core was comprised of a conventional polybutadiene material. The intermediate layer was comprised of 70 percent by weight of Exxon Iotek® 8240 and 30 percent by weight of Exxon Iotek® 7410. The mantled core was formed by injection molding the ionomeric mixture over the core.

Example 1

Mantled cores were prepared as described above with no additional processing steps.

Example 2

Mantled cores prepared as described above were roughened to a surface finish of about 125 μin. using a centerless grinding machine.

Example 3

Roughened mantled cores from example 2 were soaked in a chlorination solution for 15 minutes, rinsed with water and allowed to dry overnight under ambient room conditions.

The chlorination solution was comprised of 95.8 percent by volume water, 3.7 percent by volume commercial bleach solution and 0.5 percent by volume HCl acid (approximately 37 percent assay).

A cover comprising a single layer of Bayer MP10000 polyurethane material was Reaction Injection Molded (RIM) over each of the mantled cores of examples 1, 2 and 3 to form golf ball samples. The RIM process comprised injecting the polyurethane material at a temperature of about 130° F. around the mantled core and holding the molded golf ball in the mold for about 0.5 to 1 minutes.

Example 4

Some of the golf balls of example 3, comprising a roughened and chlorinated mantled core and a RIM polyurethane cover, were subjected to a post-treatment. The post-treatment comprised heating the golf ball in a 250° F. oven for 30 minutes.

After preparation, there were four sets of golf balls: conventional core with an untreated ionomer mantle and RIM polyurethane cover (example 1); conventional core with a roughened mantle layer and RIM polyurethane cover (example 2); conventional core with a roughened and chlorinated mantle layer and RIM polyurethane cover (example 3); and conventional core with a roughened and chlorinated mantle layer, RIM polyurethane cover and post-treatment (example 4).

Interlayer adhesion strength was tested according to the following interlayer adhesion test. Two golf balls from each of the examples were sectioned through its poles into eight equal sections. The rubber core was removed from each of the sections. The outer cover was peeled away from the mantle layer approximately 0.5 inches to create a grip area. In each case the area peeled back started at the end or pole of that section. The mantle layer grip area was placed in the upper jaws and the cover layer grip area was placed in the lower jaws of a tensile testing instrument. An MTS tensile testing machine available from Sintech (A Division of MTS Systems Corp., P. O. Box 14226, Research Triangle Park, N.C. 27709-4226) was found suitable for this testing. The tensile testing machine was started and run at a crosshead speed of 2 inches/minute. The testing was continued until the mantle and cover layers were completely separated. The peak tensile load generated for each sample during layer separation was recorded. The peak load recorded in TABLE 1 corresponds to adhesion strength between the tested layers. Two samples from each group were tested and the results averaged to arrive at the results shown in

TABLE 1

| Example | treatment | ball section (%) | grip area (in²) | widest point (in) | distance[2] (in) | peak load (lbs) |
| --- | --- | --- | --- | --- | --- | --- |
| 1 | none | ⅛ | .5 | na | .5 | 0[1] |
| 2 | roughen only | ⅛ | .5 | 0.70 | .5 | 1.4 |
| 3 | roughen + chlorinate | ⅛ | .5 | 0.72 | .5 | 5.5 |
| 4 | roughen + chlorinate + post treatment | ⅛ | .5 | 0.65 | .5 | 11.6 |

[1]Example 1 was not tested as the mantle layer separated from the cover layer during sectioning and before placement in the testing instrument.
[2]distance from grip to widest point As can be seen from the results of TABLE 1, the golf ball of example 1, receiving no adhesion treatment, had unacceptable adhesion strength of the ionomer mantle layer to the polyurethane cover. Roughening of the ionomer mantle layer prior to molding of the cover as in example 2 increased adhesion strength between the ionomer mantle and polyurethane cover layer by a minimal amount. The results of example 2 illustrate mechanical effects are not sufficient to achieve optimum interlayer adhesion strength.

Roughening and chlorinating of the mantled core prior to application of the polyurethane cover as in example 3 resulted in a surprising increase in interlayer adhesion strength of more than 300 percent (5.5 pounds peak for example 3 compared to 1.4 pounds peak for example 2).

Roughening and chlorinating of the mantled core prior to application of the polyurethane cover, followed by post-treatment of the formed golf ball at 250° F. for 30 minutes resulted in a very surprising increase in interlayer adhesion strength of more than 800 percent (11.6 pounds peak for example 4 compared to 1.4 pounds peak for example 2). It should be noted that golf balls are typically only exposed to about 150° F. for about 10 minutes during manufacturing. The post-treatment of the golf balls of example 4 at 250° F. for 30 minutes is thus at a substantially higher temperature and of longer duration than that conventionally used. The use of temperatures and times represented by the inventive post-treatment is somewhat counterintuitive given the constraints of material softening point and melting point and the disincentive to increase manufacturing production times for a high volume product such as a golf ball.

It should be noted that example 4 had the smallest width and therefore the smallest joined surface area of the tested samples. If the adhesion strength was adjusted to reflect the test sample surface area, the adhesion strength results for examples 2 and 3 would be slightly lower while the adhesion strength result for example 4 would remain the same. This result emphasizes the advantageous nature of the inventive process used in example 4

TABLE 2

| Example | treatment | widest point (in) | Normalized area | adhesion strength (lbs) | normalized adhesion strength (lbs) |
| --- | --- | --- | --- | --- | --- |
| 1 | none | na | Na | 0 | 0 |
| 2 | roughen only | 0.70 | 1.03 | 1.4 | 1.4 |
| 3 | roughen + chlorinate | 0.72 | 1 | 5.5 | 5.5 |
| 4 | roughen + chlorinate +post-treatment | 0.65 | 1.11 | 11.6 | 12.9 |

Additional intermediate golf balls were produced for testing. The core was a standard polybutadiene type core, and the mantle layer was an ionomeric resin. The balls were treated using various silicone-based adhesion promoters, both alone and in combination with other treatments such as chlorination, plasma treatment and post cure. The balls were then covered with an aliphatic thermoplastic polyurethane cover (a mix of Bayer KU2-88885 and Bayer DP7-3006 thermoplastic polyurethanes). The balls were treated with the various adhesion promoters by dipping the ball into the appropriate solution and letting it dry before molding the cover layer. For balls that were also post treated, this was done for 1½ hours at 80° C. The adhesion between the cover and mantle layer was then tested. A standard production golf ball having an ionomer resin mantle and cover was used as a control. The treatments and adhesion results are shown in TABLE 3 below.

TABLE 3

| Example | Treatment | Adhesion |
| --- | --- | --- |
| 1 | None (control) | Poor |
| 2 | Plasma treatment only | Poor |
| 3 | Epoxy system | Fair |
| 4 | Amine functional Organosilane (Gelest SIA0591 .0 ($H_2N(CH_2)_2NH(CH_2)_3Si(OCH_3)_3$)) + post cure | Fair to Good |
| 5 | Plasma treatment + Amine functional Organosilane (Gelest SIA0591.0 ($H_2N(CH_2)_2NH(CH_2)_3Si(OCH_3)_3$)) | Good to Very Good |
| 6 | 1050 Plastics Magic Adhesion Promoter | Fair to Poor |
| 7 | ATO Lupersol DDM-9 peroxide (5% by volume in MEK) | Poor |
| 8 | Chlorinate | Fair to Poor |
| 9 | Amine functional Organosilane (Gelest SII6455.0 ($OCN(CH_2)_3Si(OC_2H_5)_3$)) + post cure | Poor |
| 10 | Amine functional Organosilane (Gelest SIA0610.0 ($H_2N(CH_2)_3Si(OC_2H_5)_3$) | Good |
| 11 | Organosiloxane (Gelest DMS-E01) ($CH_2OCHCH_2O(CH_2)_3((CH_3)_2SiO)$-$((CH_3)_2SiO)_n((CH_3)_2Si)(CH_2)_3OCH_2CHOCH_2$) | Fair to Poor |
| 12 | Silsesquioxane Oligomer (Gelest WSA-9911) (See formula previously described) | Good to Very Good |
| 13 | Production control sample with ionomer cover | Excellent |

As can be seen from TABLE 3, the use of the silsesquioxane oligomer as an adhesion promoter provided the best adhesion between the thermoplastic polyurethane cover and the ionomer resin mantle layer. During testing, it was determined that the heat of molding was sufficient to adhere the cover to the mantle layer when the appropriate adhesion promoter was used. Therefore, post treatment of the ball is optional, but not necessary, when the cover is molded at a high enough temperature.

One aspect of the invention comprises a process consisting essentially of: roughening at least one of a first and a second surface to be joined and followed by chlorinating at least one of the first and the second surfaces and followed by joining of the first and second surfaces. Another aspect of the present invention comprises a process consisting essentially of: roughening at least one of a first and a second surface to be joined and followed by chlorinating at least one of the first and the second surfaces and followed by joining of the first and second surfaces and followed by post-treatment of the joined surfaces for a predetermined time at a temperature above that usually used for molding the materials of the first and second surfaces. Another aspect of the present invention comprises a process consisting essentially of: treating at least one of a first and a second surface to be joined with a silicone-based adhesion promoter and followed by joining of the first and second surfaces. As used herein, the transitional term consisting essentially of defines a limitation of the above inventive aspects to the recited steps in the recited order and those that do not materially increase the adhesion strength of the joined layers. A material increase in adhesion strength is a doubling of the adhesion strength of the joined layers receiving an adhesion treatment as compared to the adhesion strength of layers of similar materials, which have only been roughened prior to joining.

While preferred embodiments of the foregoing invention have been set forth for purposes of illustration, the foregoing description should not be deemed a limitation of the invention herein. Accordingly, various modifications, adaptations and alternatives may occur to one skilled in the art without departing from the spirit and scope of the present invention.

What is claimed is:

1. A golf ball having enhanced interlayer adhesion comprising a first layer having a bonding surface, the bonding surface having an adhesion improvement treatment comprising roughening of the bonding surface followed by chlorination of the bonding surface and a second layer having a surface joined to the bonding surface, wherein one of the first or second layers is a golf ball mantle comprised of a material selected from at least one of polyurethane, ionomer, terpolymer, metallocene catalyzed polyolefin, polyamide block copolymer and polyester/polyether block copolymer and the other of the first or second layers is a golf ball cover comprised of a material selected from at least one of polyurethane, ionomer, terpolymer, metallocene catalyzed polyolefin, polyamide block copolymer and polyester/polyether block copolymer.

2. The golf ball as in claim 1, wherein the golf ball exhibits an interlayer adhesion strength at least about three times greater than a golf ball comprising the bonding surface without the adhesion improvement treatment joined to the second layer.

3. A golf ball as in claim 1, wherein the adhesion improvement treatment consists essentially of roughening of the bonding surface followed by chlorination of the bonding surface.

4. A golf ball as in claim 1, wherein the adhesion improvement treatment consists essentially of roughening of the bonding surface followed by chlorination of the bonding surface followed by post-treatment of the joined first and second layers.

5. A golf ball as in claim 1, wherein the adhesion improvement treatment consists essentially of roughening of the bonding surface followed by chlorination of the bonding surface followed by post-treatment of the joined first and second layers, the post-treatment comprising holding the joined first and second layers at a temperature in the range of about 100 to about 400° F. for a time in the range of about 5 minutes to about 24 hours.

6. A game ball having enhanced interlayer adhesion comprising a first layer having a bonding surface, the bonding surface having an adhesion improvement treatment comprising treating the bonding surface with a silicone-based adhesion promoter and a second layer having a surface joined to the bonding surface, wherein the treatment further comprises post treatment of the game ball at an elevated temperature for a predetermined amount of time.

7. A game ball as in claim 6, wherein the game ball is a golf ball.

8. The game ball of claim 6, wherein one of the first or second layers is a golf ball mantle comprised of a material selected from at least one of polyurethane, ionomer, terpolymer, metallocene catalyzed polyolefin, polyamide block copolymer and polyester/polyether block copolymer and the other of the first or second layers is a golf ball cover comprised of a material selected from at least one of polyurethane, ionomer, terpolymer, metallocene catalyzed polyolefin, polyamide block copolymer and polyester/polyether block copolymer.

9. The game ball of claim 6, wherein the silicone-based adhesion promoter is a silsesquioxane oligomer.

10. The game ball of claim 9, wherein the silsesquioxane oligomer is

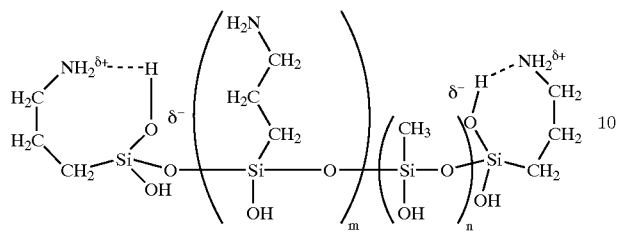

where the subscripts m and n are chosen such that the molecular weight of the oligomer is from about 250 to about 650.

11. The game ball of claim 6, wherein the treatment further comprises at least one of roughening of a bonding surface, plasma treatment of a bonding surface, or chlorination of a bonding surface.

* * * * *